United States Patent
Zheng et al.

(10) Patent No.: US 10,144,597 B2
(45) Date of Patent: Dec. 4, 2018

(54) PIPELINE TRANSPORTATION METHOD OF COAL

(71) Applicants: Yusong Zheng, Chongqing (CN); Xiangshu Zheng, Chongqing (CN)

(72) Inventors: Xiangshu Zheng, Chongqing (CN); Yusong Zheng, Chongqing (CN); Jun Zhang, Chongqing (CN); Yongmei Lai, Chongqing (CN); Luyang Xie, Chongqing (CN)

(73) Assignees: Yusong Zheng, Chongqing (CN); Xiangshu Zheng, Chongqing (CN)

( * ) Notice: Subject to any disclaimer, the term of this patent is extended or adjusted under 35 U.S.C. 154(b) by 0 days.

(21) Appl. No.: 15/806,328

(22) Filed: Nov. 8, 2017

(65) Prior Publication Data

US 2018/0057282 A1    Mar. 1, 2018

(51) Int. Cl.
| | |
|---|---|
| *B65G 53/30* | (2006.01) |
| *C10L 9/02* | (2006.01) |
| *B01D 21/26* | (2006.01) |
| *C10L 5/32* | (2006.01) |
| *C10L 5/36* | (2006.01) |

(52) U.S. Cl.
CPC .......... *B65G 53/30* (2013.01); *B01D 21/267* (2013.01); *C10L 5/32* (2013.01); *C10L 5/366* (2013.01); *C10L 9/02* (2013.01); *B65G 2201/042* (2013.01); *C10L 2270/10* (2013.01); *C10L 2290/06* (2013.01); *C10L 2290/18* (2013.01); *C10L 2290/20* (2013.01); *C10L 2290/22* (2013.01); *C10L 2290/28* (2013.01); *C10L 2290/54* (2013.01)

(58) Field of Classification Search
CPC ..... B65G 53/30; B65G 2201/042; C10L 9/02; C10L 2290/20; B01D 21/267
USPC ......................................................... 406/197
See application file for complete search history.

(56) References Cited

U.S. PATENT DOCUMENTS

| | | | | |
|---|---|---|---|---|
| 4,249,699 | A * | 2/1981 | Smith ................. | B01D 11/028 209/172 |
| 4,265,737 | A * | 5/1981 | Smith ................. | B01D 11/028 209/11 |
| 4,412,843 | A * | 11/1983 | Burgess ................. | B03B 9/005 209/9 |
| 4,536,372 | A * | 8/1985 | Burgess ................. | B03B 9/005 422/187 |
| 4,602,438 | A * | 7/1986 | Draper ..................... | C10F 5/00 34/172 |
| 4,886,522 | A * | 12/1989 | Davidson ................. | C10L 9/02 201/17 |
| 4,915,706 | A * | 4/1990 | Daley ..................... | B03B 9/005 209/10 |
| 5,033,230 | A * | 7/1991 | Kennepohl ............... | C10L 9/10 34/363 |

(Continued)

*Primary Examiner* — Joseph A Dillon, Jr.
(74) *Attorney, Agent, or Firm* — JCIPRNET

(57) ABSTRACT

A pipeline transportation method of coal is provided. The coal is pulverized and then subjected to a waterproofing treatment, so that a time needed for precipitating the pulverized coal in water is longer than a time needed for transporting the pulverized coal by flowing water to a destination. The waterproof pulverized coal is transported by water through a pipeline. After reaching the destination, the waterproof pulverized coal can be separated from the water in a static pool, collected by a cyclone separator, and then stored in a warehouse.

8 Claims, 2 Drawing Sheets

(56) References Cited

U.S. PATENT DOCUMENTS

| | | | | |
|---|---|---|---|---|
| 5,200,063 | A * | 4/1993 | Neskora | C10G 1/00 208/400 |
| 5,795,484 | A * | 8/1998 | Greenwald, Sr. | B01D 33/0315 209/10 |
| 7,469,846 | B2 * | 12/2008 | Schu | B01D 21/0012 209/12.1 |
| 9,187,697 | B2 * | 11/2015 | Gomez | C10B 19/00 |
| 2009/0272028 | A1 * | 11/2009 | Drozd | C10L 5/14 44/569 |
| 2010/0141013 | A1 * | 6/2010 | Lahr | B01D 53/62 299/16 |
| 2010/0287828 | A1 * | 11/2010 | Flemming | B03B 9/005 44/626 |
| 2012/0279117 | A1 * | 11/2012 | Bruso | C10L 5/363 44/624 |
| 2016/0251578 | A1 * | 9/2016 | Trad | C04B 7/30 208/427 |
| 2017/0101597 | A1 * | 4/2017 | Yoon | C10L 9/10 |
| 2017/0305689 | A1 * | 10/2017 | Hottovy | B65G 53/04 |
| 2018/0245001 | A1 * | 8/2018 | Humphreys | C10G 1/10 |

\* cited by examiner

PIPELINE TRANSPORTATION METHOD OF COAL

BACKGROUND

1. Field of the Invention

The present invention relates to a pipeline transportation technology of coal, and more particularly to a transportation method of coal though a hydraulic pipeline.

2. Description of Related Art

Coal, as an important fuel, is widely used in thermal power plants and industrial boilers for supplying heat. The coal is mostly transported by waterways, railways and highways in the use process. These transportation modes not only cause dust pollution and damage to environment during the loading, unloading and transportation of coal, but also result in high investment in infrastructure and limited transportation capacity. Currently, the long-distance transportation of coal generally employs the above transportation modes, while a small amount of coal is transported through pipelines as coal-water slurry.

Another way for transporting coal is via pipelines in a form of coal-water slurry, which has been successfully applied in the United States and Russia. Coal-water slurry is prepared from about 70% of dry pulverized coal, about 29% of water and 1% of additive, and then are transported through pipelines to achieve the long-distance transportation of pulverized coal. However, after the pulverized coal in the form of slurry is transported to the destination, the dry pulverized coal cannot be separated from the coal-water slurry but can only be fed into the furnace and burnt with 70% of pulverized coal as well as 29% of water. The latent heat of vaporization required by 29% water when the coal-water slurry is burned in the furnace will consume 10% of the thermal energy contained in the 70% pulverized coal. Hence, comparing with the pulverized coal, the boiler efficiency decreases by 8% or more when the coal-water slurry containing the same amount of pulverized coal is burned. Furthermore, resistance loss of pipeline is also large since the coal-water slurry has a certain viscosity. Therefore, during the transportation, the requirement of the pump for delivering the coal-water slurry is higher than the requirement of the pump for delivering water, and the energy consumption of delivering the coal-water slurry is more than the energy consumption of delivering water of the same weight.

SUMMARY

In order to overcome high energy consumption, high cost, pollution and other unfavorable factors existing in waterway, railway and highway transportation and other modes of transportation, as well as the disadvantages included in the transportation for coal-water slurry as described above, the present invention provides a method for long-distance transportation of coal though a hydraulic pipeline which is low-cost, pollution-free, safe and reliable.

The present invention discloses a method for pipeline transportation of coal and its related process, characterized in that the method comprises the following steps:

a) pulverizing the coal to obtain a pulverized coal having a diameter of 500 μm or less;

b) performing a waterproofing treatment on the pulverized coal and then soaking the pulverized coal in water, so that the time needed for precipitating the pulverized coal in the water is longer than the time needed for transporting the pulverized coal to a destination;

c) pumping water into a pipeline and then adding the waterproof pulverized coal after the water flow within the pipeline reaches a certain flow rate, such that the pulverized coal can be transported at a uniform rate;

d) pressurizing a mixture of the waterproof pulverized coal and water with a shear-free pump, which is a specific pump that applies no shear forces to the fluid being delivered, when the mixture of the waterproof pulverized coal and water needs to be pressurized to increase the flow rate before flowing to the destination, or pressurizing the water with a centrifugal pump after separating the pulverized coal from water and then adding the separated waterproof pulverized coal; and e) introducing the mixture of the waterproof pulverized coal and water into a material-separating pool having a static pressure after the mixture of the waterproof pulverized coal and water flows to the destination, wherein a filter and a drainage hole are provided below the material-separating pool, the dry waterproof pulverized coal floats on the water surface by buoyancy, and the water is discharged below and introduced into the pipeline after pressurization for reusing; and introducing the waterproof pulverized coal into a cyclone separator from the surface of the material-separating pool by using a vacuum collecting method to separate the pulverized coal from gas and then introducing to a pulverized coal bunker for use.

The present invention provides the following benefits, as compared with the prior art:

i. The method of the present invention enables a low-cost and long-distance continuous transportation of coal under a sealed condition.

ii. Coal is not affected by changes in ambient temperature (an antifreezer may be added to water), and does not result in pipeline blockage during transportation.

In the present invention, the key point is that the coal is pulverized and the pulverized coal is subjected to a waterproofing treatment. Various waterproofing treatment processes are selected to meet the requirements for various distances, provided that the waterproof pulverized coal can be transported to the destination before being participated in the water. The waterproof pulverized coal is hydrophobic so that the waterproof pulverized coal will not adhere to the pipeline's wall as flowing within the pipeline, and is suspended in the center of the pipeline while moving forward, which allows the resistance of the pulverized coal flowing in the hydraulic pipeline is the same as the resistance of water with the same volume. In other words, when the waterproof pulverized coal and the water are mixed in an appropriate ratio, the transport power required for the fluid mixture to flow is the same as the transport power required for water to flow. The present invention successfully solves the problem of high energy consumption and pipeline blockage created by the long-distance transportation of coal through pipelines.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EMBODIMENTS

Figure 1:
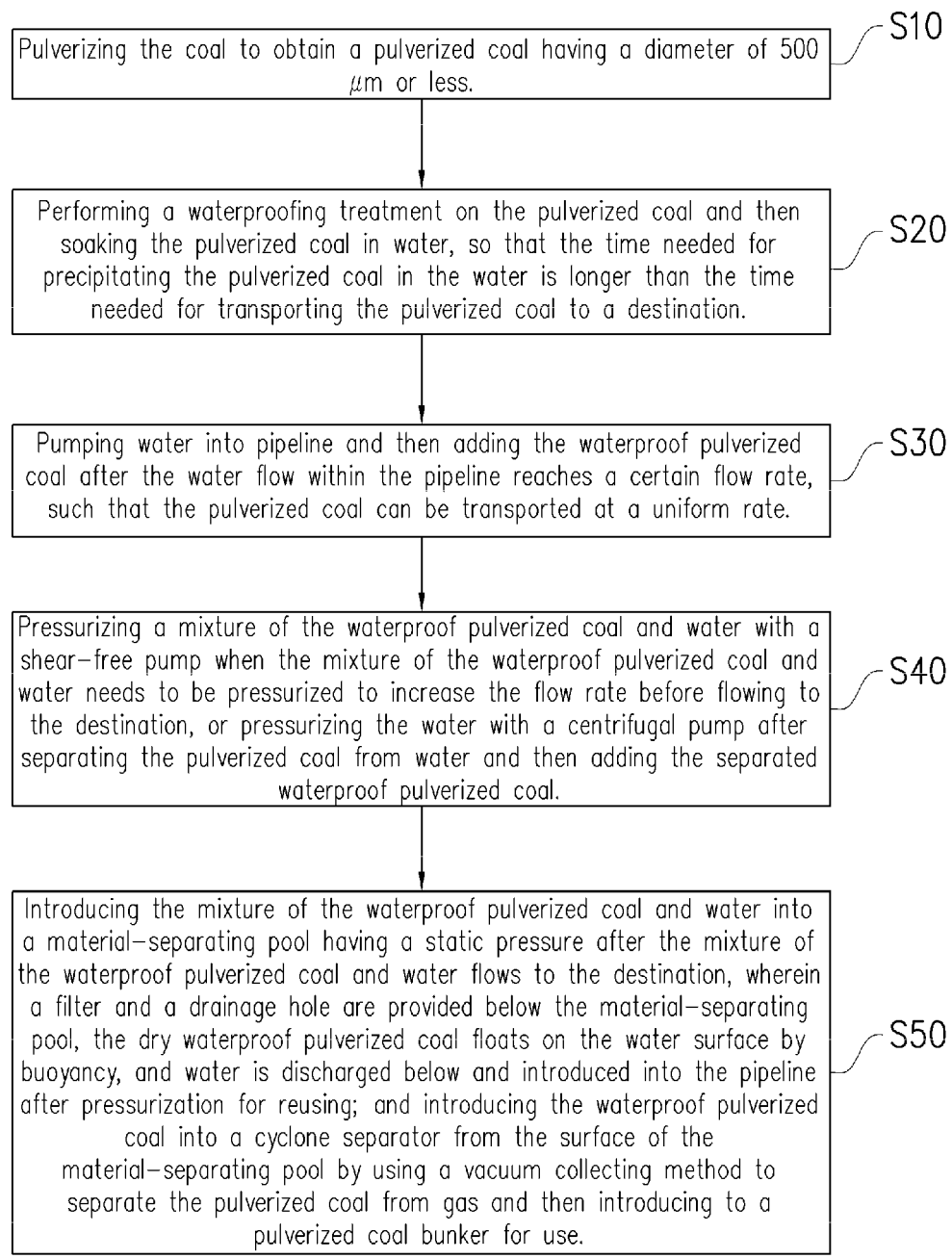
FIG. 1 is the flowchart of the method.
Figure 2:
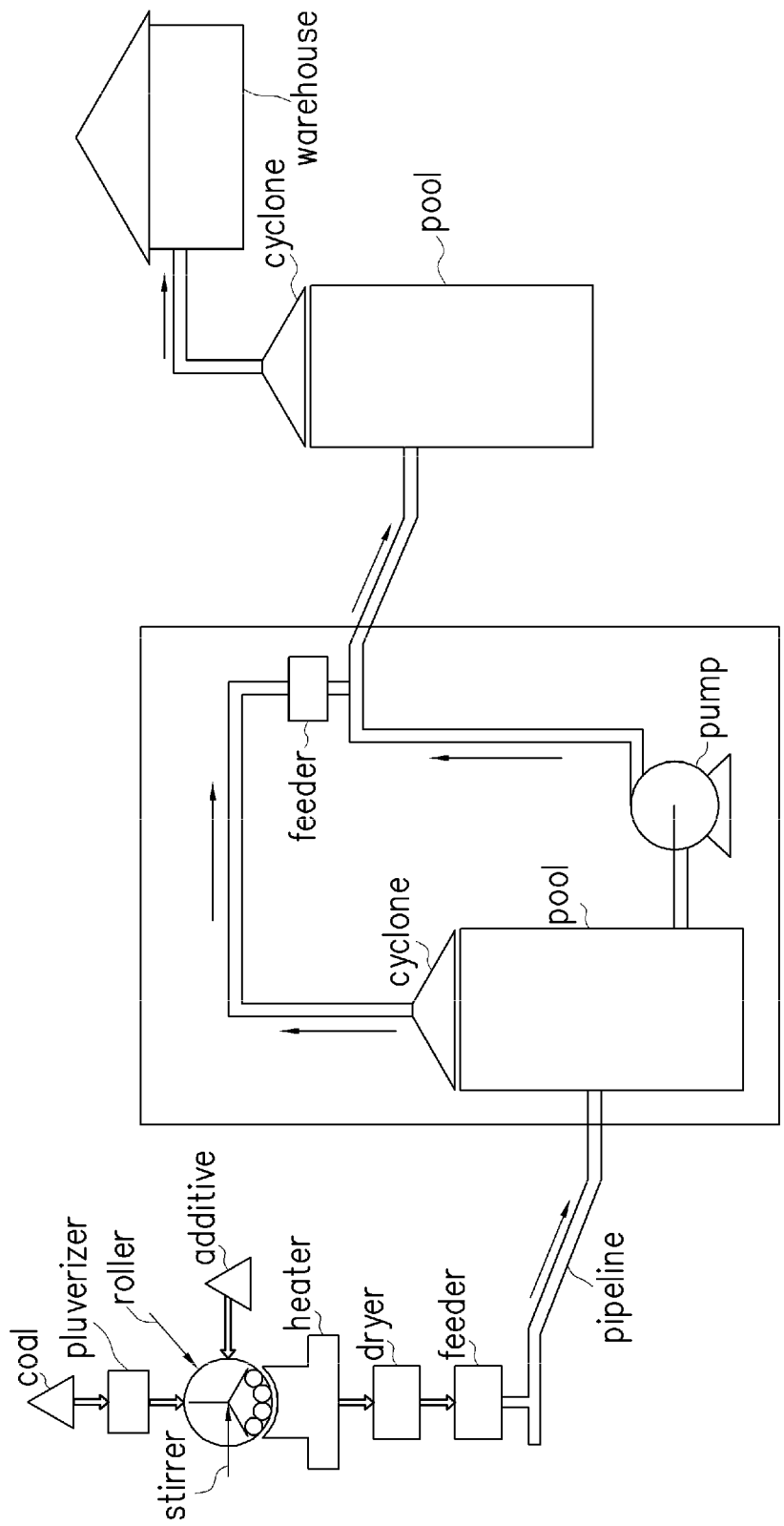
FIG. 2 is the schematic depiction.

The present invention will now be described in further detail with reference to embodiments.

The present invention provides a method for long-distance pipeline transportation of coal and its related process, characterized in that the method comprises the following steps:

a) pulverizing the coal to obtain a pulverized coal having a diameter of 500 μm or less;

b) performing a waterproofing treatment on the pulverized coal and then soaking the pulverized coal in water, so that the time needed for precipitating the pulverized coal in the water is longer than the time needed for transporting the pulverized coal to a destination;

c) pumping water into pipeline and then adding the waterproof pulverized coal after the water flow within the pipeline reaches a certain flow rate, such that the pulverized coal can be transported at a uniform rate;

d) pressurizing a mixture of the waterproof pulverized coal and water with a shear-free pump, which is a specific pump that applies no shear forces to the fluid being delivered, when the mixture of the waterproof pulverized coal and water needs to be pressurized to increase the flow rate before flowing to the destination, or pressurizing the water with a centrifugal pump after separating the pulverized coal from water and then adding the separated waterproof pulverized coal; and e) introducing the mixture of the waterproof pulverized coal and water into a material-separating pool having a static pressure after the mixture of the waterproof pulverized coal and water flows to the destination, wherein a filter and a drainage hole are provided below the material-separating pool, the dry waterproof pulverized coal floats on the water surface by buoyancy, and water is discharged below and introduced into the pipeline after pressurization for reusing; and introducing the waterproof pulverized coal into a cyclone separator from the surface of the material-separating pool by using a vacuum collecting method to separate the pulverized coal from gas and then introducing to a pulverized coal bunker for use.

The waterproofing treatment is a process of paint spraying or waxing the surface of a single particle of pulverized coal or a chemical process.

The waxing process comprises adding 0.2 to 20% of paraffin wax or paraffin emulsion (liquid paraffin) to the pulverized coal, and the pulverized coal is rolled heated up to 100° C. or higher for 20 minutes or more;

Three kinds of chemical processes for waterproofing treatment are described herein. The first chemical process comprises adding 5 to 30 wt % of $CaCO_3$ or calcium salts, 0.2 to 10 wt % of stearic acid or stearate and 0.2 to 10 wt % of paraffin wax to the pulverized coal, and the pulverized coal is heated to about 120° C. for 20 minutes or more; wherein the heating rate is 2° C./min. The second chemical process comprises adding 5 to 20 wt % of calcium hydroxide to the pulverized coal and mixing them evenly. 1 to 10 wt % of solution of ammonium aliphatate are added and the mixture is stirred thoroughly to form a paste and then is dried. The third chemical process comprises adding 2 to 20 wt % of water-soluble sodium methylsilanolate and 5 to 20 wt % of $CaCO_3$ to the pulverized coal. The mixture is stirred thoroughly and dried.

The following considerations should be taken into account when utilizing the method of the present invention:

i. When the coal of different types is made into waterproof pulverized coal, the specific weight (or density) of a single particle of the waterproof pulverized coal is less than that of the liquid carrier (i.e. water).

ii. The pulverized coal requires waterproofing treatment. Different waterproof treatment processes are employed depending on the distances for transporting the pulverized coal (i.e. the suspending time, before precipitation, of the waterproof pulverized coal after being soaked in the water) to reduce the cost for waterproofing treatment.

iii. An antifreezer may be added to the water being delivered based on the ambient temperature, such that the water is allowed to flow at a low temperature. The antifreezer of calcium salts is preferred.

It should be noted that the above embodiments are merely illustrative of the present invention and are not limited thereto. Although the present invention has been described in detail with reference to preferred embodiments, it will be understood by those skilled in the art that the present invention may be modified and substituted equivalently without departing from the spirit and scope of the present invention. These modifications and equivalent substitutes are intended to be included within the scope of the claims of the present invention.

What is claimed is:

1. A pipeline transportation method of coal, the method comprises:

pulverizing coal to obtain pulverized coal having a diameter of 500 μm or less;

performing a waterproofing treatment on the pulverized coal; and transporting the waterproof pulverized coal to a destination, which comprising:

pumping water into a pipeline until a constant flow rate of the water is reached;

adding the waterproof pulverized coal into the pipeline, such that the waterproof pulverized coal can be transported by the water at a uniform rate;

pressurizing a mixture of the waterproof pulverized coal and the water by a shear-free pump, or pressurizing the water only by a centrifugal pump after separating the waterproof pulverized coal from the water and then adding the separated waterproof pulverized coal back to the water;

directing the mixture of the waterproof pulverized coal and the water into a static pool, so that the waterproof pulverized coal can float on the water surface and the water can be discharged;

collecting the waterproof pulverized coal by a cyclone separator via a negative pressure collection method; and storing the collected waterproof pulverized coal in a warehouse at the destination, wherein a specific weight of a single particle of the waterproof pulverized coal is less than a specific weight of the water, wherein a time needed for precipitating the waterproof pulverized coal in water is longer than a time needed for transporting the waterproof pulverized coal to the destination.

2. The pipeline transportation method of claim 1, wherein the waterproofing treatment is paint spraying, waxing, or chemical treating surfaces of the pulverized coal.

3. The pipeline transportation method of claim 2, wherein the waxing method comprises:
  adding 0.2-20 wt % of paraffin wax or paraffin emulsion to the pulverized coal t form a mixture; and
  heating and rolling the mixture to a temperature of at least 80° C. for at least 20 minutes.

4. The pipeline transportation method of claim 2, wherein the chemical treating method comprises:
  adding 5-30 wt % of calcium salt, 0.2-10 wt % stearate or a salt of stearate, 0.2-10 wt % of paraffin wax to the pulverized coal to form a mixture; and
  heating and rolling the mixture to a temperature of at least 120° C. for at least 20 minutes at a heating rate of 2° C./min.

5. The pipeline transportation method of claim 4, wherein the calcium salt comprises $CaCO_3$.

6. The pipeline transportation method of claim 4, wherein a heating rate of the heating step is about 2° C./min.

7. The pipeline transportation method of claim 2, wherein the chemical treating method comprises:
  adding 5-20 wt % of $Ca(OH)_2$ to the pulverized coal to form a uniform mixture;
  adding 1-10 wt % of a solution of a fatty acid ammonium to the mixture; and
  drying the mixture.

8. The pipeline transportation method of claim 2, wherein the chemical treating method comprises:
  adding 2-20 wt % water-soluble sodium methylsilanolate and 5-20 wt % of $CaCO_3$ to the pulverized coal to form a mixture;
  stirring the mixture; and
  drying the mixture.

\* \* \* \* \*